United States Patent
Gahimer (10) Patent No.: US 8,869,931 B1
(45) Date of Patent: Oct. 28, 2014

(54) BASS-REFLEX LOUDSPEAKER ASSEMBLY FOR MOBILE DEVICES

(71) Applicant: Harman International Industries, Inc., Stamford, CT (US)

(72) Inventor: Curtis Gahimer, Indianpolis, IN (US)

(73) Assignee: Harman International Industries, Inc., Stamford, CT (US)

( * ) Notice: Subject to any disclaimer, the term of this patent is extended or adjusted under 35 U.S.C. 154(b) by 0 days.

(21) Appl. No.: 13/916,784

(22) Filed: Jun. 13, 2013

(51) Int. Cl.
*H05K 5/00* (2006.01)

(52) U.S. Cl.
USPC ............................ 181/156; 181/152; 181/155

(58) Field of Classification Search
USPC ........................................ 181/155, 152, 156
See application file for complete search history.

(56) References Cited

U.S. PATENT DOCUMENTS

| | | | | | |
|---|---|---|---|---|---|
| 4,616,731 | A | * | 10/1986 | Robinson | 181/148 |
| 4,942,939 | A | * | 7/1990 | Harrison | 181/156 |
| 5,821,471 | A | * | 10/1998 | McCuller | 181/156 |
| 7,410,029 | B2 | * | 8/2008 | Tanaami | 181/156 |
| 8,028,792 | B2 | * | 10/2011 | Arai | 181/156 |
| 8,483,776 | B2 | * | 7/2013 | Murray | 455/570 |
| 2003/0076975 | A1 | | 4/2003 | Stead et al. | |
| 2005/0217926 | A1 | * | 10/2005 | Murata | 181/156 |
| 2008/0000715 | A1 | * | 1/2008 | Bouvier | 181/156 |
| 2012/0061174 | A1 | * | 3/2012 | Maeshiba | 181/152 |
| 2012/0092812 | A1 | * | 4/2012 | Lewis et al. | 361/679.01 |

* cited by examiner

*Primary Examiner* — Forrest M Phillips
(74) *Attorney, Agent, or Firm* — Patent Law Office of David G. Beck (57) ABSTRACT

A loudspeaker assembly is provided that is suitable for use with a small mobile device, the assembly utilizing a bass-reflex design to increase low frequency efficiency and decrease speaker distortion. The loudspeaker assembly utilizes a single sound port in which the sound pressure emitted by the diaphragm is combined with the sound pressure passing through the bass-reflex channel.

20 Claims, 6 Drawing Sheets

BASS-REFLEX LOUDSPEAKER ASSEMBLY FOR MOBILE DEVICES

FIELD OF THE INVENTION

The present invention relates generally to speakers and, more particularly, to a bass-reflex loudspeaker assembly suitably sized for integration into small, mobile devices.

BACKGROUND OF THE INVENTION

In the last twenty years there has been a virtual explosion in the portable consumer electronics industry surrounding a variety of devices that are designed to provide the user with easy access to various media, including music, video and games. These devices range from dedicated media players to multi-purpose devices such as smart phones, laptops, computers and tablets. This growth has been spurred by improvements in processor speed, device efficiency, memory capacity, memory size and overall device cost. The acceptance of these devices, at least in terms of video and gaming devices, has also been on the rise due to improvements in display resolution, color accuracy, display thickness, display weight, damage resistance and electrical efficiency.

While there have been huge technological advances made in mobile devices over the course of the last few decades, in general the improvements in the audio performance of such devices have been limited to the progress made in the device's audio processing capabilities. In large part, that is because as mobile devices shrink in order to meet consumer desires and expectations, the space and size constraints placed on the speaker, as well as their location in the device enclosure, severely limit audio quality.

In order to overcome the audio performance limitations of the built-in speakers in a mobile device, many users couple their device to a set of external audio monitors, either in the form of a set of external speakers or a pair of earbuds/headphones. While this approach provides a potential solution, it adds to the cost of the device while limiting the device's portability, especially if an external speaker is used. Accordingly, what is needed is a loudspeaker assembly that provides improved audio performance and that is compatible with the small size commonly associated with laptops and smartphones. The present invention provides such a loudspeaker assembly.

SUMMARY OF THE INVENTION

A loudspeaker assembly is provided that is suitable for use with a small mobile device, the assembly utilizing a bass-reflex design to increase low frequency efficiency and decrease speaker distortion. The loudspeaker assembly utilizes a single sound port in which the sound pressure emitted by the diaphragm is combined with the sound pressure passing through the bass-reflex channel.

The loudspeaker assembly of the invention is comprised of an audio driver that includes a diaphragm and a loudspeaker enclosure. An internal wall located within the enclosure separates a portion of the acoustic back volume from the bass-reflex channel, where the acoustic back volume is coupled to the rear portion of the audio driver, and where an acoustic aperture in the internal wall is preferably used to acoustically couple the acoustic back volume to the bass-reflex channel. The sound port, which defines a volume within the loudspeaker enclosure, is adjacent to at least one sound port outlet located in an exterior wall of the loudspeaker enclosure. The sound port outlet(s), which may be in the form of a slot, couples the sound port to the external ambient environment. The exterior wall containing the sound port outlet(s) may be parallel to the diaphragm's axis of excursion and normal to the diaphragm's surface.

The loudspeaker enclosure, which preferably has an acoustic volume of less than 3 cubic centimeters, may be fabricated from a composite material or any of a variety of polymers, e.g., plastics and thermoplastics such as a polyethylene, polypropylene, polystyrene, polyvinyl chloride (PVC), acrylonitrile/butadiene/styrene (ABS), nylon, fluorinated ethylene propylene (FEP), perfluoroalkoxy (PFA), polytetrafluoroethylene (PTFE), resins, etc. The audio driver may pass through, and be sealed to, an opening in the internal wall of the loudspeaker enclosure such that a front diaphragm surface is located on a first side of the internal wall and the rear portion of the audio driver and the acoustic back volume is located on a second side of the internal wall. The bass-reflex channel may be flared at both ends.

In at least one embodiment, the loudspeaker enclosure is comprised of a lower housing member, a middle housing member, and an upper housing member, where the middle housing member defines the enclosure's internal wall. The lower housing member may be bonded, for example along the periphery of the loudspeaker housing, to the middle housing member. Similarly, the middle housing member may be bonded, for example along the periphery of the loudspeaker housing, to the upper housing member. The sound port outlet may be integrated within the middle housing member. The acoustic back volume is preferably defined by the internal side walls of the multi-piece enclosure as well as the internal enclosure surface of the bottom wall of the lower housing member and a lower surface of the middle housing member. The bass-reflex channel is preferably defined by the internal side walls of the multi-piece enclosure as well as the internal enclosure surface of the top wall of the upper housing member and an upper surface of the middle housing member. Preferably an acoustic aperture within the middle housing member acoustically couples the acoustic back volume to the bass-reflex channel.

A further understanding of the nature and advantages of the present invention may be realized by reference to the remaining portions of the specification and the drawings.

DESCRIPTION OF THE SPECIFIC EMBODIMENTS

The loudspeaker assembly of the present invention utilizes a bass-reflex design to increase low frequency efficiency and decrease speaker distortion. However, unlike a traditional bass-reflex design, the present loudspeaker assembly combines the sound pressure from the diaphragm and from the bass-reflex channel within a single sound port, i.e., the acoustic mass of the sound port couples to the acoustic mass of the bass-reflex channel. As a result, the bass-reflex resonance frequency is lowered, providing a distinct advantage for a small speaker enclosure such as that required for use with a small mobile device.

Figure 1:
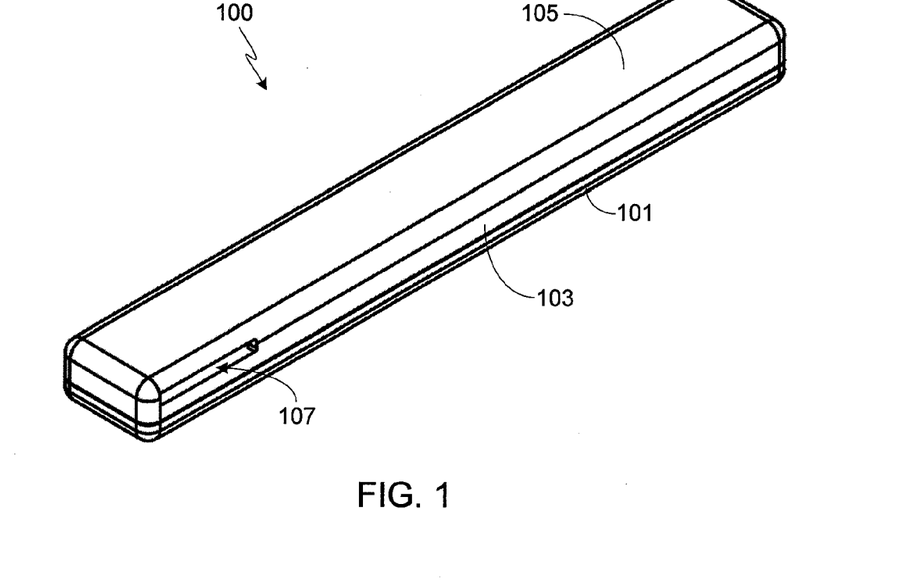
FIG. 1 provides an external, perspective view of a preferred embodiment of the loudspeaker assembly in accordance with the invention.
Figure 2:
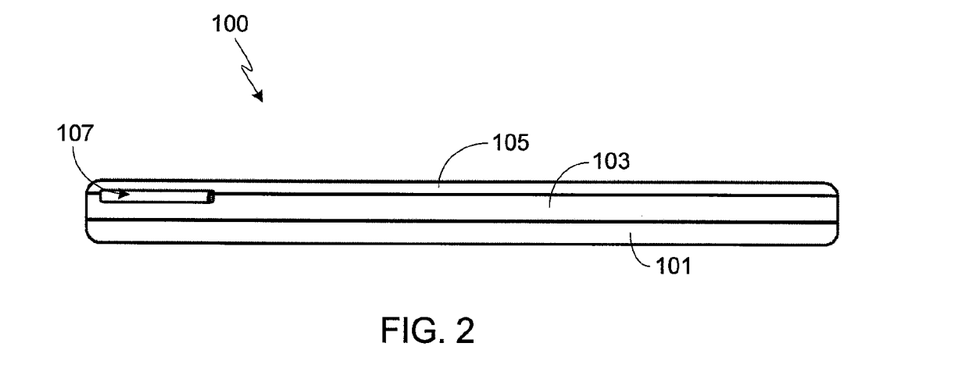
FIG. 2 provides an external, side view of the loudspeaker assembly shown in FIG. 2.
Figure 3:
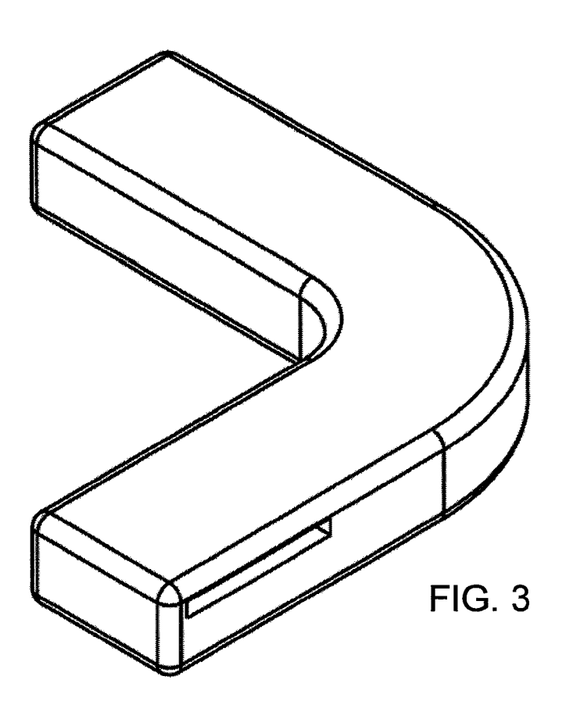
FIG. 3 provides an external, perspective view of an alternate loudspeaker assembly configured to fit within the corner volume of a mobile device.
Figure 4:
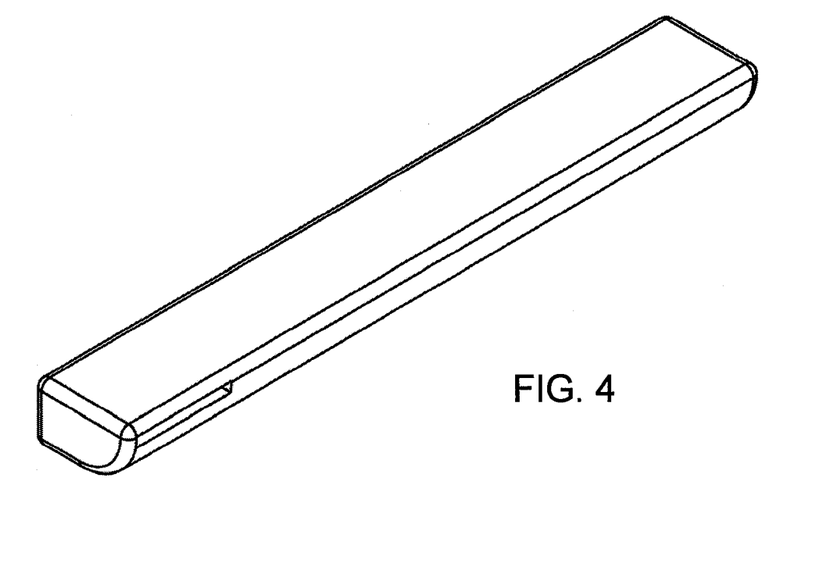
FIG. 4 provides an external, perspective view of an alternate loudspeaker assembly configured to fit within a mobile device with curved surfaces.

FIGS. 1 and 2 provide perspective and side views, respectively, of a bass-reflex loudspeaker assembly 100 in accordance with a preferred embodiment of the invention. In the illustrated embodiment, loudspeaker assembly 100 provides less than 3 cubic centimeters of acoustic volume and is fabricated as a right prism in which each face is rectangular-shaped. In at least one preferred embodiment, loudspeaker assembly 100 is approximately 80 millimeters by 11.3 millimeters by 6.5 millimeters and provides an acoustic volume of approximately 2 cubic centimeters. It should be understood, however, that other shapes and sizes may be used with the invention, the primary consideration being the available volume, as well as the shape of that volume, within the device into which the loudspeaker assembly is to fit. Thus, for example, the invention may utilize an L-shaped enclosure as illustrated in FIG. 3 in order to allow integration into the corner of the intended device, or an enclosure with curved or slanted walls as illustrated in FIG. 4 that can be incorporated into a device such as a tablet or laptop with rounded edges.

Preferably the enclosure of the loudspeaker assembly utilizes three sections, thus simplifying loudspeaker assembly fabrication, although it should be understood that the loudspeaker assembly may be manufactured with a fewer or greater number of housing members. In loudspeaker assembly 100, as well as the alternative-shaped enclosures shown in FIGS. 3 and 4, the enclosure includes a lower housing member 101, a middle housing member 103, and an upper housing member 105. Any of a variety of materials may be used for the enclosure members, although preferably the selected material is a low cost, light-weight material that can easily be manufactured into the desired shapes. Exemplary materials that may be used to fabricate the enclosure members include, but are not limited to, composite materials and any of a variety of polymers, e.g., plastics and thermoplastics such as a polyethylene, polypropylene, polystyrene, polyvinyl chloride (PVC), acrylonitrile/butadiene/styrene (ABS), nylon, fluorinated ethylene propylene (FEP), perfluoroalkoxy (PFA), polytetrafluoroethylene (PTFE), resins, etc. The enclosure members may be manufactured using any of a variety of techniques including molding (e.g., injection molding, blow molding, rotational molding, compression molding, transfer molding), thermoforming, casting, and 3D printing (also referred to as additive manufacturing).

Figure 5:
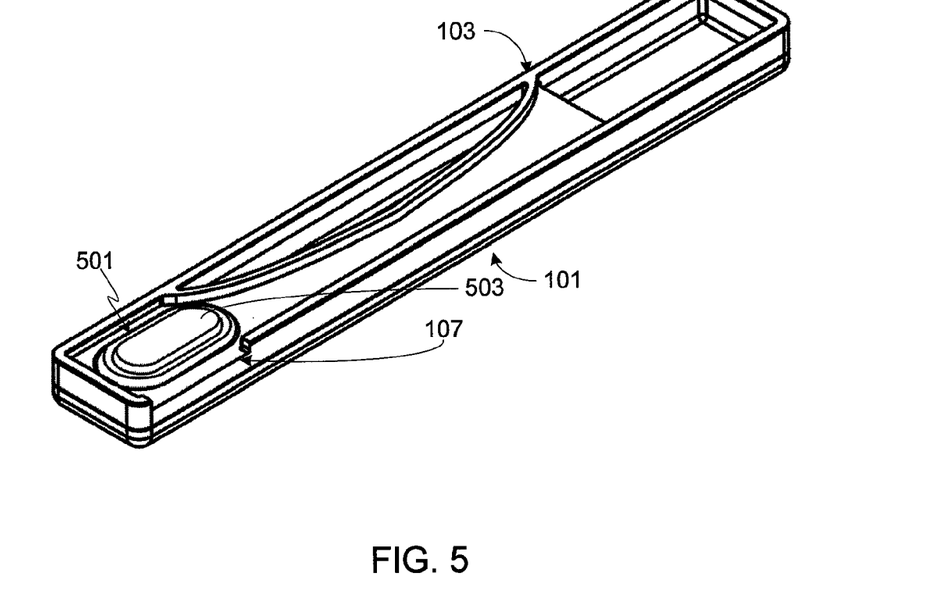
FIG. 5 provides an internal, perspective view of the audio driver and the lower and middle housing members of the loudspeaker assembly enclosure shown in FIGS. 1 and 2.
Figure 6:
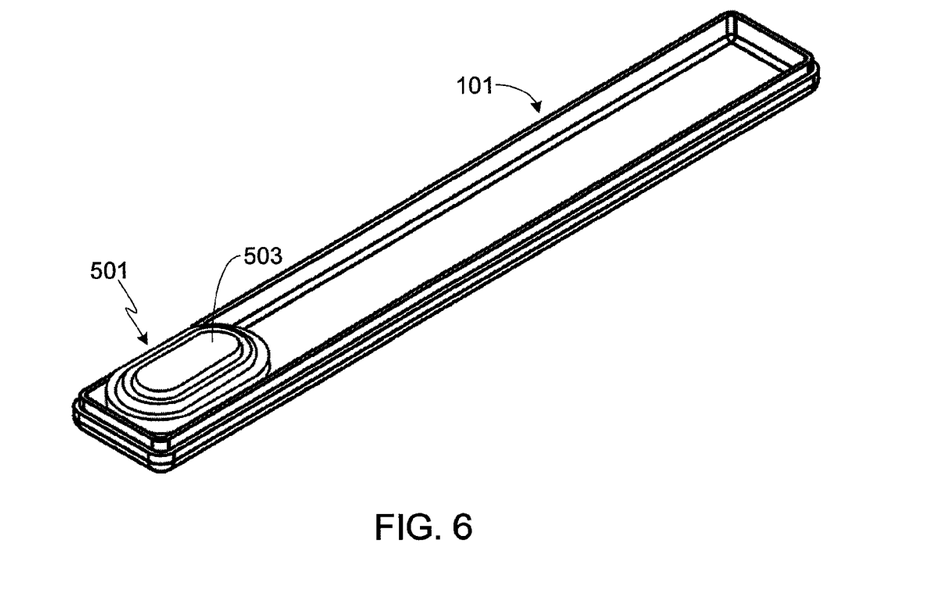
FIG. 6 provides an internal, perspective view of the audio driver and the lower housing member of the loudspeaker assembly enclosure shown in FIGS. 1 and 2.

FIG. 5 provides a perspective view of loudspeaker assembly 100 with upper housing member 105 removed. FIG. 6 provides a perspective view of loudspeaker assembly 100 with both the upper member 105 and the middle member 103 removed. Visible in both FIGS. 5 and 6 is audio driver 501. Diaphragm 503 of driver 501 is also visible in these figures. Middle housing member 103 is sealed to the periphery of lower housing member 101 and is also sealed to the audio driver 105, thereby separating the front side of diaphragm 503 from the rear portion of the diaphragm and the remaining portion of the audio driver. Similarly, upper housing member 105 is sealed to the periphery of middle housing member 103. The housing members may be bonded together using a suitable adhesive such as an epoxy, urethane, methacrylate, cyanoacrylate, contact, thermal, UV curing or other adhesive type. Alternately, the housing members may be held together using miniature screws or miniature fasteners (e.g., coupling clips integrated into the housing members).

Figure 7:
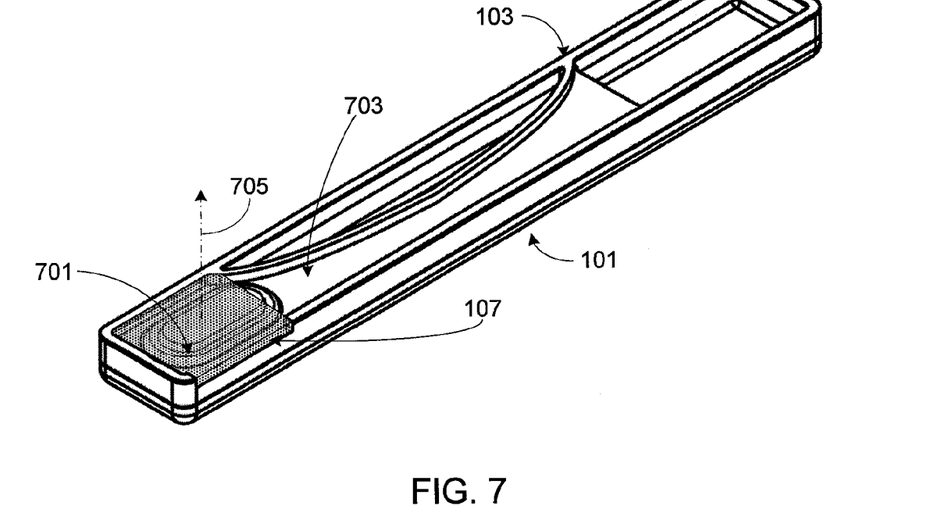
FIG. 7 provides the same view as that shown in FIG. 5, except that in this view the sound port and sound port outlet are highlighted.
Figure 8:
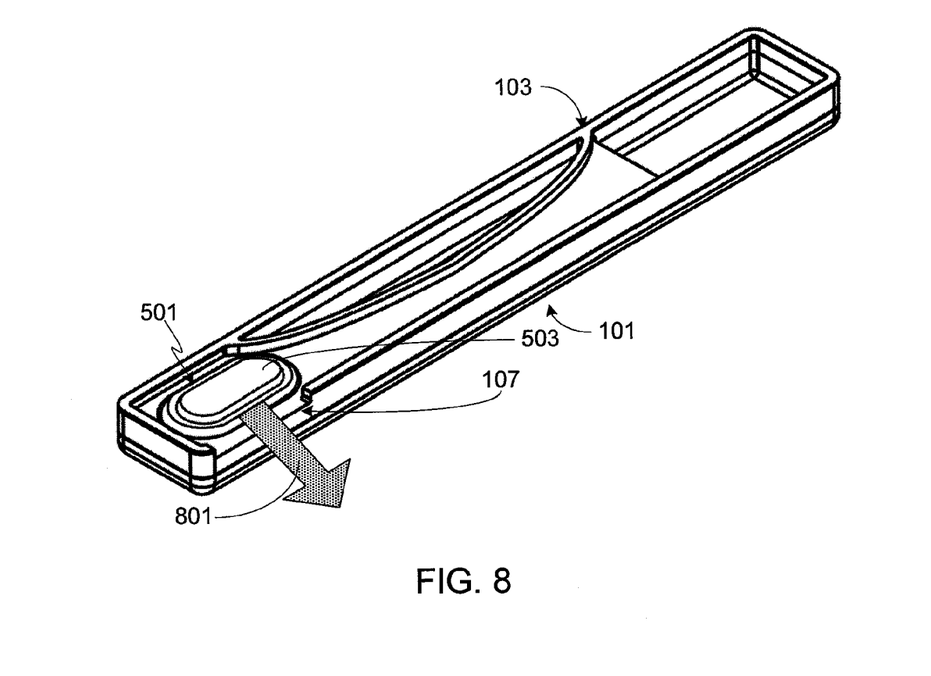
FIG. 8 provides the same view as that shown in FIG. 5, except that in this view the pathway of the sound pressure from the front side of the diaphragm and exiting out of the sound port outlet is highlighted.

As used herein and as illustrated in FIG. 7, the sound port 701 is defined as that volume within the loudspeaker enclosure in which the sound pressure emitted directly by diaphragm 503 is combined with the sound pressure passing through the bass-reflex channel 703. In this embodiment, the upper portion of sound port 701 is defined by upper housing member 105 while the bass-reflex channel defines the lower portion of the sound port. Sound port 701 allows for diaphragm excursion and as such must be greater than the maximum excursion of diaphragm 503. The acoustic volume velocity from sound port 701 exits the loudspeaker enclosure via a sound port outlet which, in the illustrated embodiment, is in the form of a single slot 107. It should be understood that the sound port outlet may take other forms than the single illustrated slot, forms such as a series of enclosure perforations or multiple co-located slots, etc. In the illustrated embodiment, the wall in which the sound port outlet 107 is located is normal to the surface of diaphragm 503 and parallel to the diaphragm axis of excursion 705 of audio driver 501. Sound pressure emitted from the front side of diaphragm 503 enters sound port 701, exiting the enclosure following pathway 801 via a sound port outlet 107 as shown in FIG. 8.

Figure 9:
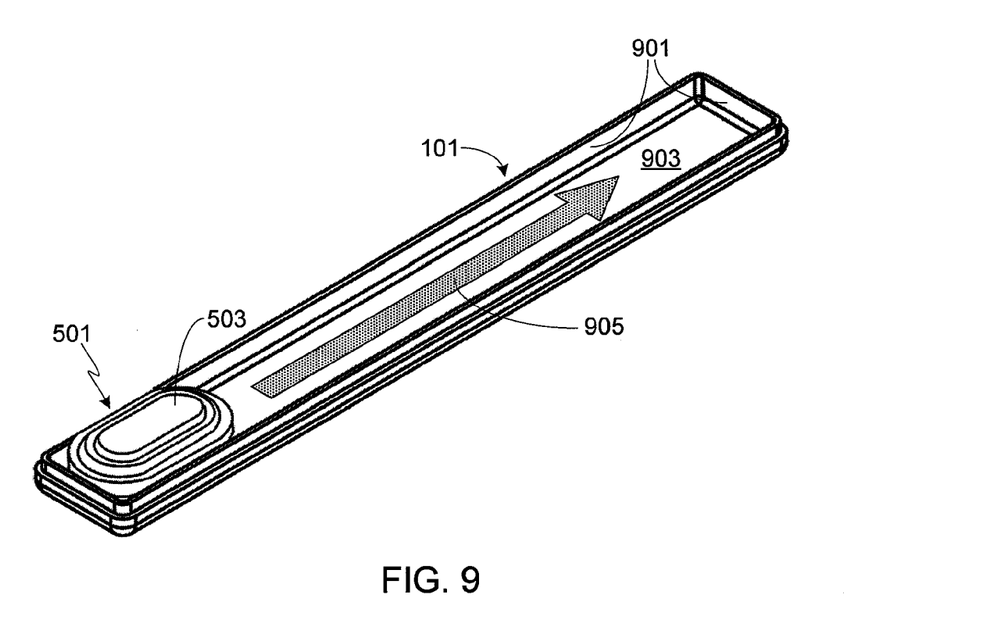
FIG. 9 provides the same view as that shown in FIG. 6, except that in this view the pathway of the sound pressure coming off of the back of the diaphragm is highlighted.
Figure 10:
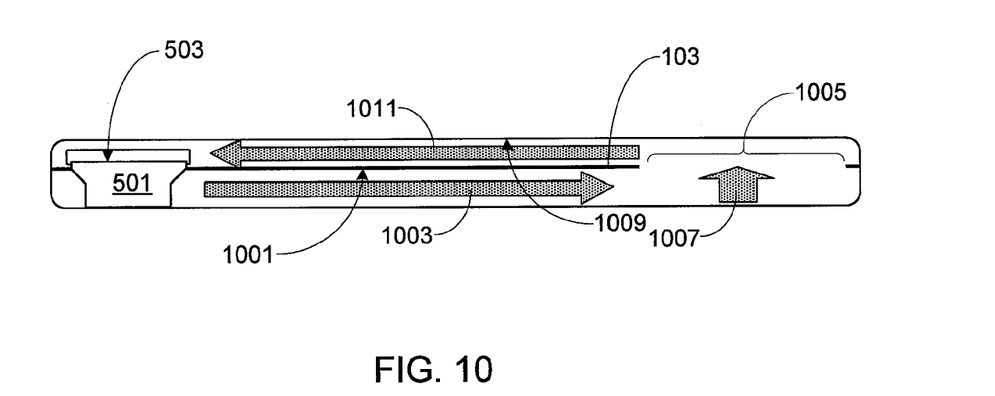
FIG. 10 provides a cross-sectional view of the speaker assembly shown in FIGS. 1 and 2, this view illustrating how the acoustic back volume is coupled to the sound port.
Figure 11:
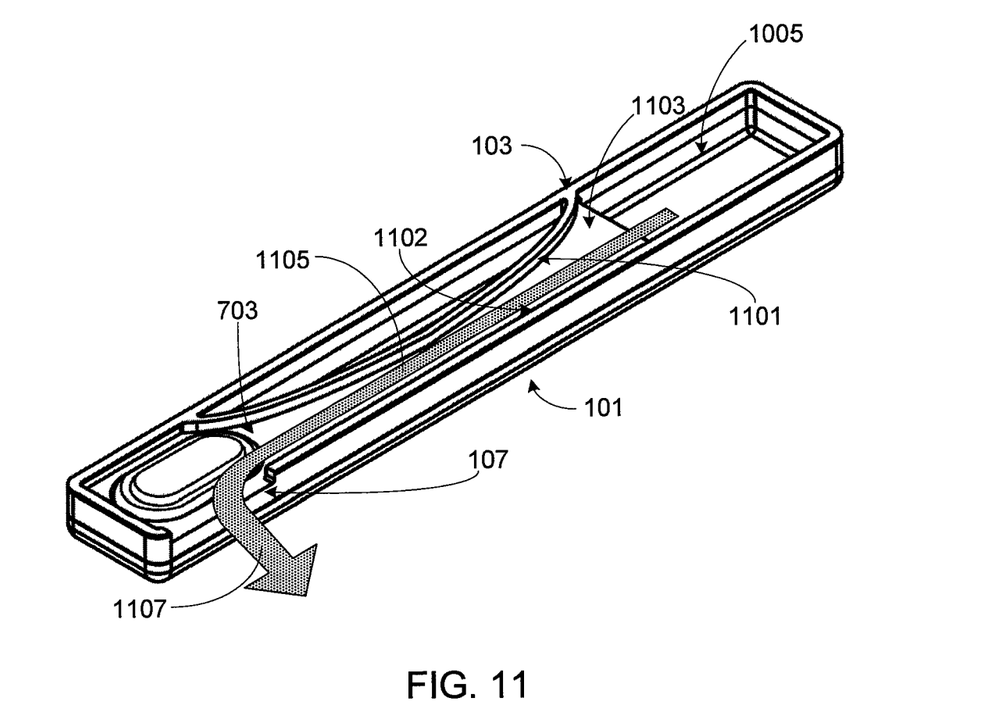
FIG. 11 provides the same view as that shown in FIG. 5, except that the pathway for the sound pressure passing through the bass-reflex channel and exiting out of the sound port outlet is highlighted.

FIGS. 9-11 illustrate the acoustic back volume of loudspeaker assembly 100 as well as the bass-reflex channel outlet. FIG. 10 provides a cross-sectional view of the assembly that illustrates the acoustic coupling of the rear portion of driver 501 and diaphragm 503 to the sound port. As shown in the figures, the sound pressure emitted from the rear of diaphragm 503, which is 180 degrees out of phase with the pressure coming off the front of diaphragm 503, passes through the acoustic back volume of the enclosure defined by the side walls 901 of the loudspeaker assembly enclosure, the internal enclosure surface 903 of the bottom wall of housing member 101, and the lower surface 1001 of middle housing member 103. This portion of the sound pressure coming off the back of diaphragm 503 is represented by pathway 905 in FIG. 9 and pathway 1003 in FIG. 10.

The acoustic back volume is coupled to the bass-reflex channel by an opening 1005, also referred to herein as an acoustic aperture. Acoustic aperture 1005, located in the middle housing member 103, allows the sound pressure from the rear of diaphragm 503 to follow pathway 1007 (see FIG. 10). The sound pressure from the acoustic back volume passes through opening 1005 and then through the bass-reflex channel which is defined by the side walls 1101/1102 of middle housing member 103, the top surface 1103 of middle housing member 103, and the internal enclosure surface 1009 of upper housing member 105. This portion of the sound pressure coming off the back of diaphragm 503 is represented by pathway 1011 in FIG. 10 and pathway 1105 in FIG. 11. The sound pressure from the bass-reflex channel passes into sound port 701 before exiting loudspeaker assembly 100 via sound port out 107 via pathway 1107. Preferably the bass-reflex channel is the same height as sound port 701 and sound port outlet 107, thus maximizing performance. Additionally, in the preferred embodiment the bass-reflex channel is flared at either end, the flares in the illustrated embodiment due to the curvature of middle housing member side wall 1101.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A loudspeaker assembly, comprising:
an audio driver, said audio driver further comprising a diaphragm; and
a loudspeaker enclosure, said loudspeaker enclosure comprising:
an internal wall located within said loudspeaker enclosure, wherein said internal wall separates a portion of an acoustic back volume from a bass-reflex channel, wherein said acoustic back volume is coupled to a rear portion of said audio driver, wherein said acoustic back volume is lateral to said rear portion of said audio driver, wherein said acoustic back volume does not extend behind said audio driver, wherein said bass-reflex channel is lateral to said audio driver, and wherein said bass-reflex channel does not extend behind said audio driver;
a sound port defining a volume within said loudspeaker enclosure, wherein a first sound pressure emitted by said diaphragm is directly coupled to said sound port, and wherein a second sound pressure emitted by said rear portion of said audio driver and passing through said bass-reflex channel is combined with said first sound pressure within said sound port; and
at least one sound port outlet adjacent to said sound port and located in an exterior wall of said loudspeaker enclosure, wherein said at least sound port outlet couples said sound port to an external ambient environment.

2. The loudspeaker assembly of claim 1, wherein an acoustic aperture in said internal wall acoustically couples said acoustic back volume to said bass-reflex channel.

3. The loudspeaker assembly of claim 1, wherein said exterior wall containing said at least one sound port outlet is parallel to a diaphragm axis of excursion and normal to a surface of said diaphragm corresponding to said audio driver.

4. The loudspeaker assembly of claim 1, wherein said at least one sound port outlet is comprised of a slot within said exterior wall of said loudspeaker enclosure.

5. The loudspeaker assembly of claim 1, wherein an upper surface of said sound port is coplanar with an upper wall of said loudspeaker enclosure, and wherein a lower surface of said sound port is coplanar with an upper surface of said bass-reflex channel.

6. The loudspeaker assembly of claim 1, wherein said audio driver passes through an opening within said internal wall.

7. The loudspeaker assembly of claim 6, wherein said audio driver is sealed to said opening of said internal wall, wherein a front surface of said diaphragm is located on a first side of said internal wall, wherein said rear portion of said audio driver is located on a second side of said internal wall, and wherein said acoustic back volume is located on said second side of said internal wall.

8. The loudspeaker assembly of claim 1, wherein said bass-reflex channel is flared at both a first end portion and a second end portion, wherein said first end portion is proximate to said sound port and distal from said second end portion.

9. The loudspeaker assembly of claim 1, wherein said loudspeaker enclosure is fabricated from a material selected from the group of materials consisting of composite materials, polymers and resins.

10. The loudspeaker assembly of claim 9, wherein said polymer is selected from the group of polymers consisting of polyethylene, polypropylene, polystyrene, polyvinyl chloride (PVC), acrylonitrile/butadiene/styrene (ABS), nylon, fluorinated ethylene propylene (FEP), perfluoroalkoxy (PFA), and polytetrafluoroethylene (PTFE).

11. The loudspeaker assembly of claim 1, wherein said loudspeaker enclosure is comprised of a lower housing member, a middle housing member and an upper housing member, and wherein said middle housing member defines said internal wall.

12. The loudspeaker assembly of claim 11, wherein said lower housing member is bonded to said middle housing member, and wherein said middle housing member is bonded to said upper housing member.

13. The loudspeaker assembly of claim 12, wherein said lower housing member is bonded to said middle housing member along a first periphery of said loudspeaker enclosure, and wherein said middle housing member is bonded to said upper housing member along a second periphery of said loudspeaker enclosure.

14. The loudspeaker assembly of claim 11, wherein said at least one sound port outlet is integrated into said middle housing member.

15. The loudspeaker assembly of claim 11, wherein said acoustic back volume is defined by internal side walls of said loudspeaker enclosure and an internal enclosure surface of a bottom wall of said lower housing member and a lower surface of said middle housing member.

16. The loudspeaker assembly of claim 15, wherein said bass-reflex channel is defined by internal side walls of said loudspeaker enclosure and an internal enclosure surface of a top wall of said upper housing member and an upper surface of said middle housing member.

17. The loudspeaker assembly of claim 11, wherein an acoustic aperture in said middle housing member acoustically couples said acoustic back volume to said bass-reflex channel.

18. The loudspeaker assembly of claim 1, wherein said loudspeaker enclosure has an acoustic volume of less than 3 cubic centimeters.

19. The loudspeaker assembly of claim 1, wherein an assembly height defined by said bass-reflex channel and said acoustic back volume and said internal wall is substantially equivalent to an audio driver height, and wherein a rear surface of said audio driver substantially immediately adjacent to a first interior surface corresponding to a lower enclosure wall of said loudspeaker assembly.

20. The loudspeaker assembly of claim 19, wherein said assembly height extends from said first interior surface corresponding to said lower enclosure wall of said loudspeaker enclosure to a second interior surface corresponding to an upper enclosure wall of said loudspeaker enclosure.

\* \* \* \* \*